United States Patent [19]

Ducateau et al.

[11] Patent Number: 5,506,963
[45] Date of Patent: Apr. 9, 1996

[54] REAL-TIME MANAGEMENT SYSTEM HAVING COPROCESSORS ALLOCATED TIME SLICES OF DIFFERENT DURATIONS TO FUNCTIONS AND PROCESSORS EXECUTED FUNCTIONS SIMULTANEOUSLY IN ACCORDANCE WITH THE TIME ALLOCATION

[75] Inventors: Michel Ducateau, Nogent-Le-Roi; Jean-Marie Sers, Velizy; Isabelle Pain, Jouy En Josas, all of France

[73] Assignee: Sextant Avionique, Meudon La Foret, France

[21] Appl. No.: 955,446

[22] Filed: Oct. 2, 1992

[30] Foreign Application Priority Data

Oct. 3, 1991 [FR] France .................................. 91 12171

[51] Int. Cl.$^6$ .............................. G06F 9/44; G06F 13/10
[52] U.S. Cl. .................... 395/200.03; 395/826; 395/827; 395/840; 395/878; 395/650; 395/800; 364/942.5; 364/942.1
[58] Field of Search ..................................... 395/550, 650, 395/325; 364/131, 200, 900; 177/25.15

[56] References Cited

U.S. PATENT DOCUMENTS

| | | | |
|---|---|---|---|
| 4,425,616 | 1/1984 | Woodell | 364/200 |
| 4,847,751 | 7/1989 | Nakade et al. | 364/200 |
| 4,858,101 | 8/1989 | Stewart et al. | 364/131 |
| 4,937,777 | 6/1990 | Flood et al. | 395/325 |
| 4,954,948 | 9/1990 | Hira et al. | 395/650 |
| 5,154,246 | 10/1992 | DiGiulio et al. | 177/25.15 |
| 5,210,872 | 5/1993 | Ferguson et al. | 395/650 |
| 5,210,873 | 5/1993 | Gay et al. | 395/650 |

FOREIGN PATENT DOCUMENTS

| | | |
|---|---|---|
| 0223463 | 5/1987 | European Pat. Off. . |
| 0264317 | 4/1988 | European Pat. Off. . |

OTHER PUBLICATIONS

ACM Transactions on Computer Systems, vol. 5, No. 3, Aug. 1987, New York, US; pp. 189–231; K. Schwan et al. "High–Performance Operating System Primitives for Robotics and Real-time Control Systems".

Technology and Science of Informatics, vol. 3, No. 1, 1984, Oxford, GB, pp. 37–43; F. Browaeys et al. "Sceptre: Proposed Standard for a real–time executive kernel".

Computer, vol. 9, No. 10, Oct. 1976, Long Beach US; pp. 10–17: R. B. Bunt. "Scheduling Techniques for Operating Systems".

*Primary Examiner*—Thomas C. Lee
*Assistant Examiner*—Le Hien Luu
*Attorney, Agent, or Firm*—Browdy and Neimark

[57] ABSTRACT

The method embodying the invention comprises management by a coprocessor of the time slicing, from a pre-established frame, of the processing cycle of the processor, into slices of possibly different durations, of the allocation of the time slices to the different functions installed according to one or plural pre-established layouts, of the saving at the end of the machine context slice of the function being processed, this with a view to resuming this function during the following slice associated with it and of the loading, at the start of a new slice, of the machine context linked with the activating of the function associated with this slice and which was previously saved at the end of a previous slice corresponding to this function. The invention applies to the optimizing and security of real-time management in modular avionics architectures.

12 Claims, 3 Drawing Sheets

REAL-TIME MANAGEMENT SYSTEM HAVING COPROCESSORS ALLOCATED TIME SLICES OF DIFFERENT DURATIONS TO FUNCTIONS AND PROCESSORS EXECUTED FUNCTIONS SIMULTANEOUSLY IN ACCORDANCE WITH THE TIME ALLOCATION

BACKGROUND OF THE INVENTION

1. Field of the Invention

This invention relates to a method and device for real-time management of a system comprising at least one processor capable of managing plural functions each comprising a set of services performed by the processor during execution of a software program capable of using sensors and/or actuators, this set of services being based on material resources inside the processor.

It mainly applies, though not exclusively, to the optimizing and security of real-time management in IMA-type (Integrated Modular Avionics) architectures.

2. Description of the Prior Art

It is generally known that the current organization of the different computers on a carrier plane is referred to as "spread out", since the computers required to perform avionics functions are positioned in several places in the carrier.

This obviously leads to certain drawbacks among which the following might be mentioned:

- substantial weight due to the mechanical structures of each computer,
- global oversizing in terms of material resources such as the processors, inputs/outputs, power supplies, etc.,
- different origins and therefore different designs of the computers (multiple equipment vendors), entailing a multitude of different electronic boards for similar functions, while all boards having a same general function (processor, input/output, memory) are globally very alike.

Understandably, this diversity entails series costs and maintenance costs that are not optimized for aircraft constructors and airline companies.

The heterogeneousness of the electronic equipment installed can also lead to excessive downtime of the units when no replacement is available in the event of failure.

In order to attempt to obviate these drawbacks, considerable developments are in process. The object of these developments is to concentrate, in large racks, all or part of the functions performed by the on-board electronics (currently spread over different computers), by installing them in a small number of standardized modules to enable aircraft constructors to purchase from different equipment vendors.

All the processings performed by the computers or calculators on board a carrier can be broken down into major functions or applications each corresponding to a service of very high level for the carrier, and among which the following can notably be found:

automatic piloting,
the electric flight controls,
integrated maintenance,
flight management,
fuel management,
flight screen control,
smoke detection, etc.

In the continuation of the description, a function will be assimilated with a group of tasks providing high-level services to the carrier, and this Group of tasks cannot be spread over more than one processor module. Several functions can be installed in a same processor.

Integration of the functions into a same rack with a common backpanel bus, division of a same processor for certain functions, distribution of the inputs/outputs used for communications between the rack, the sensors and the actuators, power supply are not entirely devoid of security problems.

These resources require particular attention in order to avoid failure of an element entailing the rack, and therefore a large number of functions, being put out of operation.

In fact, very strict rules exist to ensure the best of security for the equipment and to verify compliance with the specifications.

The certification stage, a very costly stage enabling the equipment to be qualified for marketing purposes, checks among other things that these rules have been complied with.

OBJECT OF THE INVENTION

The main object of this invention is therefore to remedy these problems.

SUMMARY OF THE INVENTION

Accordingly, there is provided a process for management of the real-time context of a system comprising at least one processor capable of managing plural functions, wherein it comprises the following stages:

time-division of the processing cycle of the processor into slices of possibly different durations;

allocation, to at least part of these slices, of respective functions, the tasks relating to each of these functions being inoperative outside the slice of time corresponding to this function;

saving at the end of the machine context slice of the function being processed, this with a view to resuming this function during the following slice associated with it; and loading, at the start of a new slice, of the machine context linked with the activating of the function associated with this slice and which was previously saved at the end of a previous slice corresponding to this function.

This management by processor time slice by function and not by task, for successively and cyclically processing the functions installed in the processor, notably ensures segregation of the real-time objects specific to each function, therefore reinforces security and facilitates certification by enabling real-time behavioral analysis by function, independently of the other functions installed.

This de-correlation enables flexibility in the functional distribution in the different processors of the rack, linked, e.g. to carrier developments, thereby considerably reducing the difficulty with certification problems.

After analysis at rack level of each of the functions and of the associated processor load, the processing cycle of each processor is split into time slices. The duration of each slice can be different.

Each slice may or may not have a function allocated to it.

Let us suppose the function FX to be allocated to the slice TX.

It is within the slice TX that the tasks of function FX compete for the processor in which the function FX is installed.

Outside the slice TX, the tasks of the function FX are inoperative or in the "frozen state".

The study of the bahavior of the tasks of a function for certification is almost exclusively limited to behavior of the function in a processor that is virtually less efficient though not divided into several functions.

This management enables each function installed to successively possess the processor and the shareable hardware resources of the processor, in cyclical manner.

For the functions F1, F2, ... FN and a cycle of duration T:

- the shareable resources are attributed to F1 during the duration t1,
- the shareable resources are attributed to F2 during the duration t2,
- the shareable resources are attributed to FN during the duration tn,
- then the shareable resources are again attributed to F1 during the duration t1 given that t1+t2+. . . +tn=T In a general manner, the sharing of the different resources between the operations in process, the management of the inputs/outputs and the handling of the auxiliary functions (e.g. management of the date and time) are performed by a supervisor nucleus with the following characteristics:

- it is capable of executing several programs in apparent simultaneity; to do so, the operating system distributes the time of the instruction processor(s) and internal memory between entities called "tasks"; it can also provide mechanisms for communication between the tasks;
- it handles the details of input/output operations, whether with regard to time scheduling, error corrections or the synthesis of complex operations. The programming language of the core virtual machine is an extension of the machine language of the base computer, a special mechanism enabling the creation of new instructions, referred to as primitives and whose role it is to request intervention of the nucleus to perform complex operations. It is particularly at this level that are situated the so-called real-time functions which enable the features reserved for the system to be used.

The core virtual machine can be accessed by high-level machines and, via the latter, by tasks submitted by users.

Two supervisor levels are distinguished on a time-slice managed processor embodying the invention.

The first level or "Application Supervisor" is the level on which a function will rely to schedule its tasks in relation to the real-time context, and consequently in relation to the resources and events required by the function to perform within the cyclically allocated time slice.

The second level or "Sequencing Supervisor" is the level which will provide the services needed for time-sharing of the processor between the different functions installed therein and management of the global events (in the broadest sense) of the processor or rack such as initializing of the rack or module initializing a function, power cutoff, mode changes such as uploading of the code linked with one or more functions of the rack, reconfiguration of the rack, powering up, etc.

In the case of avionics systems, it so happens that the performance of the two supervisor levels "Application Supervisor" and "Sequencing Supervisor" using the machine language of the processor or a high-level processing language, has a certain number of drawbacks. Among others, mention might be made of the difficulty with realization, poor performances for the different services and a very low degree of security.

On-board electronics function in a critical real-time context with a very high level of security, and attempted embodiments of even a single-function real-time nucleus at software level only imperfectly meet the requirements of a real-time environment of the avionics type, especially when the applications are written in a high-level language such as ADA.

To ensure this management of supervisors at two levels with the required security criteria, the invention provides, from a software configuration set up upon initialization of the rack or of the processor and a time reference common to the racks and cyclically retimed by synchronization, a set of automata grouped together in the form of a single coprocessor associated with each processor capable of providing services for split-time management of the functions (attributed to the Sequencing Supervisor), but also, for each function, services more conventionally attributed on an supervisor nucleus to the Application Supervisor.

The two supervisor levels then rely on the services provided by the coprocessor when a primitive is requested.

For global hardware events at rack or module level and internal events such as time management, the coprocessor alerts the proper supervisor level when task-level action is required. In this way, part of the processing, over and beyond the algorithm of the primitives is transparent for the processor.

For this purpose, the coprocessor avails of all data relating to the global real time of the processor, such as the states of the functions, the states of the global events, the durations of the time slices, but also the states of all real-time objects handled by all tasks of all functions installed in the processor. However, there is a physical partitioning in the component which ensures segregation of the real-time objects specific to each function.

The coprocessor is in the form of a component connected, on the one hand, to the local memory bus of the associated processor, and on the other hand, to the memory bus referred to as swap bus (said memory buses can be 32-bit buses).

It functions on the local memory bus according to two modes:

- in the slave mode, it is perceived by the processor as memory; this mode is used to execute primitives or service requests to the coprocessor which translates by successive reading and writing at the coprocessor address;
- in the master mode, it takes possession of the local bus to go and read or write data in the local memory; this mode is used for copy operations which are described in detail hereinafter.

It operates on the swap memory bus in the master mode.

It takes possession of the swap memory bus to read and write memory swap data e.g. for copy purposes or in the backpanel bus interface component.

These accesses are carried out:

- either by memory block copy operations initialized under the responsibility of the processor, but for which exchanges are conducted under the responsibility and at the initiative of the coprocessor by means of cyclestealing from the processor,
- or via the processor by passing through the coprocessor which then only steps in to take control of the swap memory bus.

It provides the Sequencing Supervisor with services to ensure split-time management of the functions.

It also provides services to the Application Supervisor.

These services requested by the processor in the form of primitives enable real-time linking of a function to be ensured within a time slice.

The different automata of the coprocessor linked to the services of the Application Supervisor(s) are common to all applications. Conversely, the tables of real-time statuses such as task states, semaphore states, event states, etc., are partitioned into time slices. In this way, the security of the real-time data specific to each application is ensured.

For function switching at the end of time slices, the coprocessor component may function according to two modes.

The first mode is used when only the coprocessor is handling system or rack time management.

In this case, depending on the configuration loaded upon initialization by the software, the coprocessor generates an interruption destined for the processor at the end of each time slice to indicate to it that it must abort the function in process to take up the function indicated by the coprocessor. This enables the processor to coherently load the tables of the memory management unit.

This interruption is generated from a counter contained in the coprocessor and which is reinitialized at the end of each time slice for the duration of the following slice on the basis on an internal table (configurated upon initialization of the processor).

Upon receipt of the interruption:

the processor executes a code sequence which enables it to save the minimum machine context of the function in process for proper resumption, at the next associated time slice;

it then transmits a message to the coprocessor to advise it that it is ready to receive the number of the newly active function as well as the top priority task to be executed belonging to this function;

the processor then reloads the machine context linked with the activation of the function and with the election of the task in question; the task context had been saved at the end of the last time slice relating to the newly reactivated task.

The coprocessor reloads the slice counter by the value contained in the internal table corresponding to the activated function. The states of the real-time objects handled by the de-activated function can no longer be accessed by the processor, except in special cases.

To operate in this mode, each coprocessor in the rack must be equipped with a synchronization device for maintaining system time common to all the coprocessors in order to ensure slice change synchronization for different modules.

From the initialization of the rack, each coprocessor observes and transmits on a common clock line via a wired OR.

Transmission takes place via an interface.

At each clock period, each coprocessor waits on the most delayed coprocessor for its clock generation.

When the most delayed clock signal catches up, all the coprocessors synchronize their clocks.

The clock period resulting from this synchronization is compared to two time references "minimum value, maximum value".

All the coprocessors that detect a clock period thus obtained outside the window indicate it to their processor by an interruption and invalidate the interface emitting their clock on the common line.

Through the intermediary of this clock, a system time common to all the rack modules is reconstituted.

The second mode is the one where the time reference is managed by the backpanel bus interface component. In this case, the change of slice is controlled by this component which alerts the processor by means of an interruption. The processor then executes a primitive which orders the coprocessor to change applications. The coprocessor then checks that the slice change is indeed within a time window. Each change of slice is thus checked with regard to references loaded by software in the coprocessor upon initialization.

During a time slice, the device only manages all or part (case of complementary services carried out by software) of the real-time objects of the function associated with the slice.

The coprocessor handles two times:

the local time of the function which is managed as soon as the associated time slice is completed and reactivated at the next attributed slice;

the global time of the system which is permanently counted down.

The real-time objects handled by the device and by time slice comprise at least the following:

the tasks, the events, the counter semaphores, the mailboxes, the timeouts, the cycles.

The tasks

A task is a program belonging to a function, program to be executed by a processor to enable a job to be carried out for this function.

To start or continue execution, a task can encounter time, hardware or software conditions. A fundamental condition is to have the processor available, taking into account the priorities within the function for performance of the task.

A task can take on different states during an application cycle. These states are defined by a state transition graph and the transitions are conditioned by the execution of the primitives encountered, external events and by time events inside the coprocessor.

A task has attributes that characterize it and condition its execution:

priority number in the function, active time slice number, durations of execution, expiration and reactivation.

The task can be placed in the following six states:

Dead task

A dead task is a task that is known by the application but does not have any connection with the launching context. In the event of an anomaly deemed serious, one or more tasks may find themselves unable to perform, in which case they are put into the "dead" state and are no longer managed.

Dormant task

The task has all the parameters to start its application. This is the normal state of a task having completed execution or that has just been initialized.

Eligible task

An eligible task is a task awaiting an active resource. It can be performed as soon as the scheduler decides to allocate the processor to it.

Elected task

A task that has Gained possession of the processor passes from the eligible state to the elected state.

It can be anticipated by another task depending on the criteria selected by the scheduler. If, in the course of execution, the task encounters an unconditional suspension primitive or an unfulfilled condition concerning time, a write operation in a full mailbox, a read operation in an empty mailbox, or an event, it abandons the processor to another task.

Blocked task

An elected task having encountered one of the above-mentioned unfulfilled conditions is placed in the blocked state.

This task passes into the eligible state when the condition is fulfilled.

A task may be blocked due to:

time, busy semaphore, writing in a full mailbox, reading in an empty mailbox, an event, a cycle, or unconditionally.

Frozen task

A task is placed in the frozen state when the function to which it belongs is inactive.

Once the time slice allocated to the function is ended, all the tasks associated with the function in question leave their state and move into the frozen state. When another time slice is allocated to this function, all the corresponding frozen tasks revert to their previous state except if, during the frozen state, Global events or global expirations of time occurred and tasks were awaiting these events or expirations of time.

The frozen tasks in the blocked state due to these events move into the eligible state upon activation of the function.

From the point of view of the nucleus of the Application Supervisor, a task can be in the following two fundamental states:

it is active if it is in the course of execution in the processor, otherwise it is on stand-by.

In this respect, it can be on stand-by, awaiting an event if it farmed out an operation to another element of the configuration and is awaiting completion of said operation.

It can be awaiting a resource in the general sense, if in order to continue it requires a piece of hardware of software that is unavailable.

A resource can be taken to be a software or hardware component of a data processing system that can be allocated to a single task, i.e. the case of a simple resource managed via binary semaphores, or to plural tasks, i.e. the case of a counter resource managed by counter semaphores; a resource can then be pre-empted under the control of the Application Supervisor once it has been freed by the task in possession of it for the simple resource, or has been freed by one of the tasks in possession of it for the counter resource.

Only the absolute time managed by the coprocessor concerns all the functions.

The Sequencing Supervisor only recognizes two states for the functions:

active for the function associated with the time slice in process, inactive in the case of all other functions.

The Events

An event is a mechanism ensuring synchronization either between one or more tasks and the external environment, or between several tasks.

When an event occurs, the tasks awaiting this event can continue execution subject to certain conditions (processor available, no other stand-by . . . ).

The events are:

either software events, i.e. the occurrence of the event is triggered by the execution of a primitive in a task or interruption program, or hardware events, i.e. the occurrence of the event is triggered by a physical signal outside or inside the component.

The external physical signals can be global events or local events.

They can provoke a processing inside the coprocessor which consists in putting all tasks awaiting this event in the eligible state. All tasks awaiting these occurred events of which the associated function is inactive, move from the frozen and blocked state to the frozen and eligible state. It is only when their function is activated that they can take possession of the processor provided they have priority.

The Semaphores

The coprocessor handles the counter semaphores.

Counter semaphores are used for shared management of resources common to a limited number of possessors.

The Mailboxes

The coprocessor manages the mailboxes. It controls, via the primitives it issues, saturation due to the writing of messages in a full mailbox and the reading of messages in an empty mailbox.

A mailbox is a common mechanism used for asynchronous intertask communications within a function.

Time

The real-time clock, the reference in process control, is used to ensure proper performance of the function and compliance with the environment-linked time constraints.

Time, which is managed by the coprocessor, enables inter alia stand-bys due to timeouts to be marked and tasks to be activated subsequent to timeouts. In the case of a task blocked due to a timeout, expiry of this timeout moves this task into the eligible state.

Management of absolute time enables the time to be partitioned into slices associated with the different functions.

It also enables freezing of the local real-time contexts to the different functions installed in the processor.

On local or global time, services such as the blocking of tasks due to timeout, awaiting of an event or time-bound resources are provided.

The Cycles

A task declared Cyclical is a task that is automatically reactivated by the coprocessor every N times the application to which it belongs moves from the inactive state to the active state.

The main primitives accessible to the Application Supervisor(s) are listed below, though it must be understood this list is not set for once and for all and may develop as a function of future requirements.

Task-associated primitives

Activate:
  Moves the task from the dormant state to the eligible state.
Activate-upon-event:
  Moves the task from the dormant state to the awaiting-event state, if the event has not occurred. The task will move into the eligible state upon occurrence of the event.
  The task can be reactivated upon each occurrence of the event provided the previous execution has been completed (equivalent to executing Activate-upon-event each time the task is completed).
Activate-after-timeout:
  Moves the task from the dormant state to the awaiting-timeout state. The task will move into the eligible state upon expiry of the timeout.
Activate-after-timeout-from-start-of-next-slice:
  Same function as Activate-after-timeout except that the decrementing of the timeout only starts upon interruption of the start of the next slice associated with the function.
Activate-cyclically:
  The task is reactivated every N occurrences of the application to which it belongs, at the end of a timeout D starting at the slice start interruption.
End:
  Moves the task in process into the dormant state.
  Suppresses the "cyclical" or "automatically reactivatable upon event" character of the task.
Kill:
  The task specified moves from any state whatsoever into the dead state.
Awaiting-reactivation:
  The task in process moves into the "dormant-awaiting-reactivation" state.
Suppress-reactivation:
  The task loses its "cyclical" or "automatically reactivatable upon event" character but remains in process if it was in process.
Priority:
  The task takes on the new level of priority specified as a parameter.
Block:
  Prevents the task moving into the state in process but does not modify its state.
Resume:
  Re-authorizes the task to move into the state in process if it had been prohibited by the Block primitive.
Block-with-timeout:
  Prohibits the task from moving into the state in process until expiry of the timeout or execution of the Resume primitive.
Consult:
  Enables all parameters characterizing the state of the task to be known.
Reactivate:
  Moves the task from any state whatsoever into the eligible state (suppresses all stand-by conditions).

Primitives Associated with Software Events

Position:
  Puts the event into the occurred state and moves the tasks awaiting this event into the eligible state.
Erase:
  Puts the event into the non-occurred state.
Signal:
  Creates a pulse upon event: the tasks awaiting this event move into the eligible state, but the event moves immediately back into the non-occurred state.
Wait:
  Moves the task in process into the "awaiting-task" state. Occurrence of the event will move the task into the eligible state. If a protection timeout is specified, the task will become eligible upon expiry of said timeout, if the event has not occurred.

Primitives Associated with Hardware Events

Position:
  Positions the corresponding output in the upper level.
Erase:
  Positions the corresponding output in the lower level.
Signal:
  Generates a pulse at the corresponding output.
Wait:
  Moves the task in process into the "awaiting-hardware-event" state. Switching to the upper level of the corresponding input will move the task into the eligible state. If a protection timeout is specified, the task will become eligible upon expiry of said timeout, provided the input has not already switched to the upper level.

Primitives Associated with the Semaphores

Reserve:
  Request for reservation of an entry point of the semaphore. If there is no free input point left, the task in process moves into the "awaiting-semaphore" state; otherwise, it remains in the state in process. In cases where a protection timeout is specified: if the task has not gained access to the semaphore upon expiry of the timeout, it returns into the eligible state and is suppressed from the semaphore stand-by queue (abort).
Free:
  Frees an entry point of the semaphore: may entail reactivation (i.e. moving into the eligible state) of a task on stand-by on this semaphore.
Consult:
  Enables the number of entry points free on the semaphore, the number of task on stand-by to be known.
Initialize:
  Enables the semaphore to be initialized.

Primitives Associated with the Mailboxes

Deposit:
  Request to deposit a message in the box. If the box is full, the task in process moves into the "awaiting-mailbox-write-operation" state; otherwise, it remains in the state in process and the message is copied from the original address to the box. If the task deposits a message into an empty box, it may entail reactivation (i.e. moving into the eligible state) of a task awaiting a read operation in this box. In the case of a protection timeout being specified: if the task has not gained read access to the box upon expiry of the timeout, the task returns to the eligible state and is suppressed from the mailbox stand-by queue (abort).
Extract:
  Request to read (with extraction) of a message in the box. If the box is empty, the task in process moves into the "awaiting-mailbox-read-operation" state; otherwise, it remains in the state in process and the message is transferred from the box to the destination address. If the task extracts a message from a full box, it may entail reactivation (i.e. moving into the eligible state) of a task awaiting writing in this box. In the case of a protection timeout being specified: if the task has not gained read access to the box upon expiry of the timeout, the task returns to the eligible state and is suppressed from the mailbox stand-by queue (abort).

Consult:
  Enables the number of messages deposited in the box, the number of tasks awaiting a read or write operation in the box to be known.

Initialize:
  Enables the box to be initialized.

Primitives Associated with Time

Awaiting-timeout:
  Moves the task in process into the "awaiting-timeout" state. The task will move into the eligible state upon expiry of the timeout.

Awaiting-timeout-from-start-of-slice:
  Same function as "awaiting-timeout" except that the timeout only begins to be decremented at the start of the next slice associated with the function to which the task belongs.

Read-absolute-time:
  Enables the value of the absolute time counter to be read.

Start-and-load-scheduled-time:
  Enables the scheduled time counter for a task to be loaded and validates counting down.

Stop-scheduled-time:
  Enables the counting down of the scheduled task time to be stopped. Returns the current value of the counter.

Consult-scheduled-time:
  Enables the value of the scheduled task time counter to be read.

Start-and-load-execution-time:
  Enables the task execution time counter to be loaded and validates its counting down.

Stop-execution-time:
  Enables the counting down of the task execution time to be stopped.

Consult-execution-time:
  Enables the value of the task execution time counter to be read.

Other Primitives

Lock scheduler/Unlock scheduler:
  These two primitives enable the scheduler in the coprocessor to be locked and unlocked.
  It is thus possible to perform a series of primitives without calling into question the task in process.

Copy:
  The coprocessor manages a copy primitive.
  This primitive enables blocks of size that can be parameterized to be transferred from a source memory to a destination memory of which the addresses are specified as parameters.
  The source and destination can be indifferently situated in the local memory or in the swap memory.
  Transferral of the block can take place by locking the bus(es) required for transferral to ensure the coherency of all the data of the block.
  An on-line checksum can be carried out and verified in relation to the reference which is the last word to be transmitted.

Validate-exceptions:
  After indicating an exception to the processor, the coprocessor locks the transmission of other exceptions to the processor. Execution of the "validate-exceptions" primitive unlocks the transmissions of exceptions.

End-application-initialization:
  Sets to "1" the internal coprocessor boolean marking the end of the application initialization phase. Certain primitives cease to be authorized when this boolean is at "1" (primitives initializing boxes, semaphores, . . . ). Only a RESET can return this boolean to "0".

Reset-application:
  Resets all objects belonging to an application (tasks and associated counters, boxes, semaphores, . . . ) to the same state as after a powering up.

Time Controls Associated with the Tasks

To each task of each application corresponds a series of counters enabling execution time and reactivation of the latter to be monitored.

In this manner, activation time, time of real possession of the processor and the time between two activations are monitored.

In the case of overshooting, an interruption is generated towards the processor in order to signal the anomaly.

The primitives associated with management by slices (which can only be accessed by the Sequencing Supervisor) include primitives that can only be accessed during initialization and primitives that can be accessed during and subsequent to the initialization phase.

The primitives that can only be accessed during initialization comprise:

a) primitives that can be accessed in the case of internal management of slice changes such as the following primitive:

Application-sequencing-programming:
  Defines the order in which the applications are called and the time allocated to each of these. The total duration of the cycle must be greater than or equal to the sum of the durations of the applications. Should it be greater than it, a blank time (i.e. without any application) is reserved at the end of the cycle.

b) primitives that can be accessed in the case of external management of the slice changes, such as the following primitives:

Application-duration-timer-programming:
  For each application, a timer enables the duration of the time slice allocated to the application to be controlled at each cycle.
  The duration entered as a parameter is the minimum amount of time that the slice should last for the application specified. Should a change of application occur before the previous application has expended its minimum time, an exception will be signaled to the Sequencing Supervisor.

Application-frequency-timer-programming:
  For each application, a timer ensures that the time between two successive calls of the application does not exceed a certain value.
  The duration entered as a parameter is the maximum duration which must intervene between two successive calls of the application specified.

c) and primitives that can be accessed irrespective of the management, such as the following:

Absolute-time-programming:
  Programming of absolute time at a given value.

End-initialization:
Positions the internal coprocessor boolean marking the end of the initialization phase of the Sequencing Supervisor data. Certain primitives cease to be authorized when this boolean has been activated. Only a RESET can return this boolean to the inactive state (hardware RESET or "RESET-component" primitive).

The primitives that can be accessed during and subsequent to the initialization phase comprise:

a) in the case of internal management of The slice changes, primitives such as:

Change-application:
The application in process is blocked, the application specified as a parameter is activated.

b) primitives that can be accessed irrespective of the management,

Reset-component:
Resets all the coprocessor objects to the same state as after a powering up.

The list of primitives can, of course, develop in accordance with the applications designer's will as a function of the nucleus implanted and of the performances he wishes to have.

The possible transitions between the different states that a task can have are conditioned by the execution of primitives, by external events (hardware events, RESET), or by internal events (arrival at expiry of a timeout).

Certain transitions are managed solely by the scheduler: transitions between the ELIGIBLE and ELECTED states. The choice of elected task depends on the priority of eligible tasks, as well as on the execution of the Block and Resume primitives on certain of these tasks . . .

All tasks are in the DORMANT state after a RESET.
It is possible to move from the DORMANT state to:
- the ELIGIBLE state by means of the Activate and Activate-cyclically primitives, or by automatic reactivation (for tasks having been activated with the Repetition= Yes parameter, and for cyclical tasks);
- the BLOCKED state by primitives of the activate-upon-condition type (Activate-upon-event, Activate-after-timeout);
- the DEAD state by means of the Kill primitive.

It is possible to move from the ELIGIBLE state to:
- the ELECTED state solely by decision of the scheduler;
- the DEAD state by means of the Kill primitive.

It is possible to move from the ELECTED state to:
- the ELIGIBLE state by decision of the scheduler (pre-emption);
- the BLOCKED state by primitives of the awaiting-condition type: Await (software-event), Await (hardware-event), Reserve (semaphore), Deposit (box), Extract (box), Awaiting-timeout;
- the DORMANT state by means of the End primitive;
- the DEAD state by means of the Kill primitive.

It is possible to move from the BLOCKED state to:
- the ELIGIBLE state by the end of a stand-by condition (occurrence of the event, freeing of the semaphore, extraction of a message in the box, depositing of a message in the box, arrival at expiry of the timeout);
- the DEAD state by means of the Kill primitive.

In this respect, it should be stressed that calling of the scheduler for the purpose of attributing the processor to an eligible task can only be carried out:
- upon transition from the "blocked" to the "eligible" state of a task;
- upon transition from the "dormant" to the "eligible" state of a task;
- upon transition from the "elected" to the "dormant" state of a task;
- upon transition from the "elected" to the "dead" state of a task;
- upon transition from the "elected" to the "blocked" state of a task;
- upon transition from the "elected" to the "elected and frozen" state of a task corresponding to the end of a slice;
- at the start of a slice.

BRIEF DESCRIPTION OF THE DRAWINGS

Further features and advantages of the invention will be apparent from the following particular description of a preferred embodiments of this invention, provided as an unrestricting example, as illustrated in the corresponding accompanying drawings in which.

DESCRIPTION OF THE PREFERRED EMBODIMENTS

Figure 1:
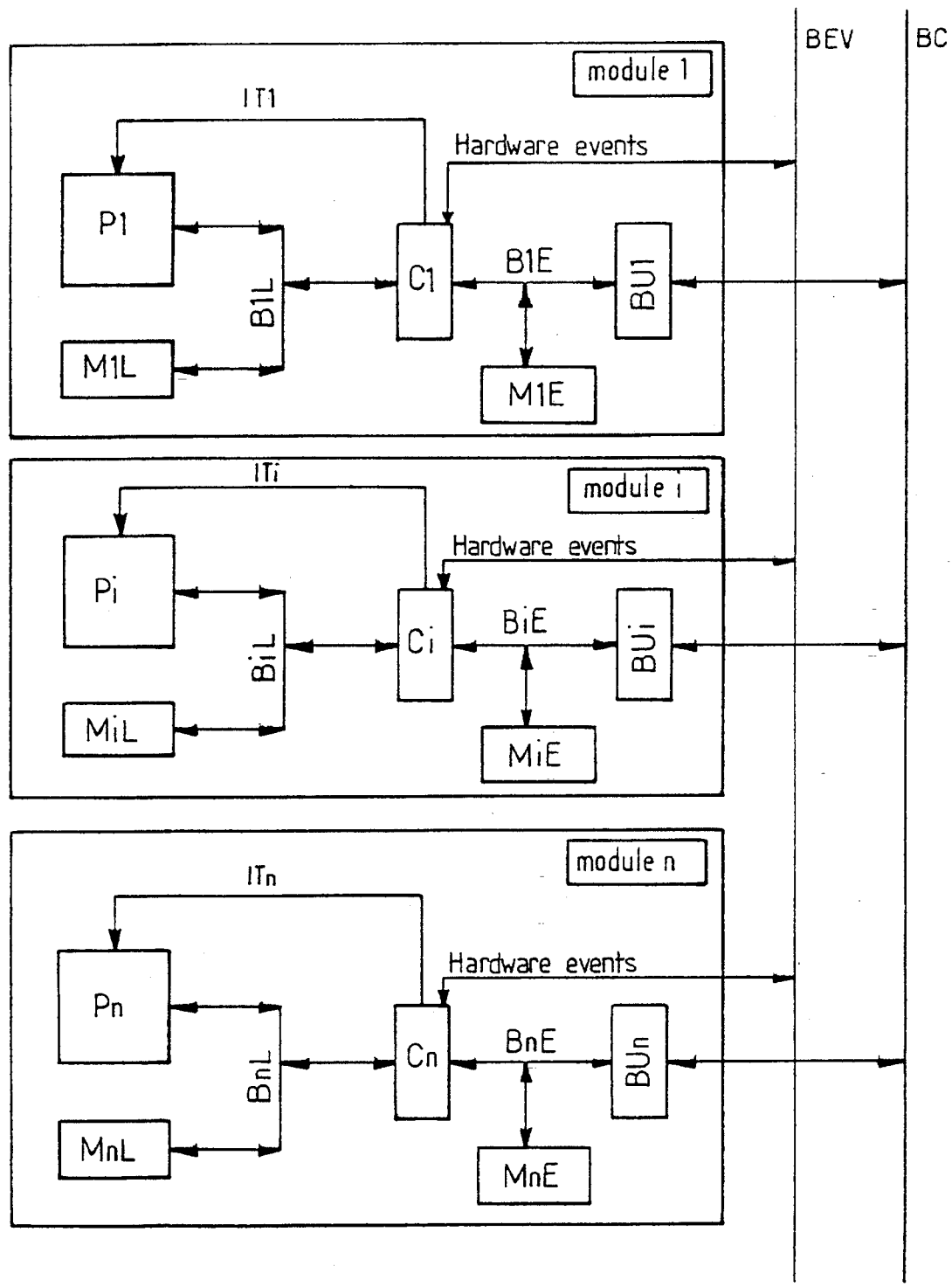
FIG. 1 schematically represents a multiprocessor architecture using coprocessors embodying the invention.

The architecture represented in FIG. 1 uses plural modules (module 1, module i, module n) each comprising a processor (P1, Pi, Pn) connected to a local memory (M1L, MiL, MnL) via a local memory bus (B1L, BiL, BnL) and connected to a bus common to the structure BC.

This connection to the bus BC is made via a coprocessor C1, Ci, Cn embodying the invention which is connected to:
- the local memory bus (B1L, BiL, BnL);
- a local swap bus (B1E, BiE, BnE) connected to a local swap memory (M1E, MiE, MnE) and to the common bus BC, via an interface BU1, BUi, BUn; and
- the processor Pi via a line transmitting the interrupt signals and a hardware event bus BEV common to all modules.

Each coprocessor C1, Ci, Cn comprising sequencing automata and a specific wired logic, acts in respect of the processor P1, Pi, Pn to which it is attached as a real-time coprocessor independently of the type of processor and high-level programming language used by the latter.

Its purpose is to provide low-level real-time services and communications services with the interface function of the common bus BC (backpanel bus), with optimized performances in a multifunction environment with sliced processor time management.

Accordingly, it can handle time management of the time slices, and therefore of the services that can be used by the Sequencing Supervisor at processor level and the providing of real-time services that can be used by the Application Supervisor(s) for all functions installed in the processor, while ensuring segregation of the objects handled by these different functions.

From the point of view of the associated processor, it behaves like a local memory zone. It has the electronics required to recognize addresses, the transmission and reception of data to be processed and the generating of the control signals for its exchanges with the associated processor (via bus B1L, BiL, BnL), with the swap memory (M1E, MiE, MnE) or the common bus BC, with the local memory (M1L, MiL, MnL) and with the common event bus BEV.

Figure 2:
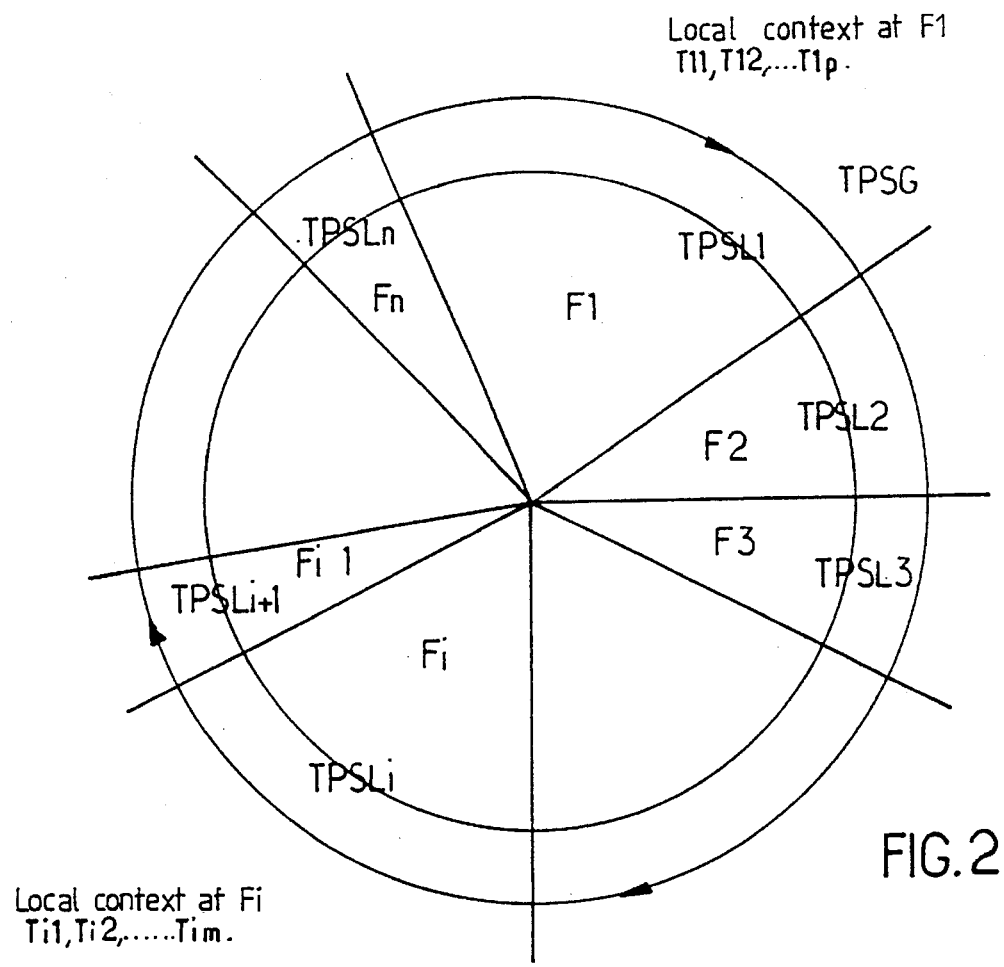
FIG. 2 represents the time slicing for successive executions of the applications in cyclical manner with local times and global times.

This coprocessor C1, Ci, Cn further comprises means for managing in time slices T1, T2 . . . , TN of variable but cyclically reproduced duration, the real-time objects comprised of tasks, hardware and/or software events, semaphores, mailboxes and the local time of the function (TPSL1, TPSL2 . . . TPSLi . . . TPSLn) and global (TPSG) or absolute time, objects managed by one or more nuclei that can be different by time slice, and therefore by function (F1, F2 . . . Fi . . . Fn), as well as means for processing said primitives that can only handle the objects associated with the function corresponding to the active time slice (FIG. 2).

This coprocessor (C1, Ci, Cn) further comprises mechanisms and communications links between the different processors of the structure for ensuring time synchronization in order to manage an absolute (or system) time common to all processors in the structure for performing synchronous slice changes and the broadcasting of critical real-time events to all these processors via the event bus BEV, and a scheduler capable of managing the tasks context in relation to the active time slice, the coprocessor deciding the moving of these tasks from one state to another as a function of the primitives and the local real-time context of the function.

It can interrupt the processor when a task of higher priority rating than the task in process is elected. This involves transmission of an interruption to the associated processor via the link IT1, ITi, ITn, the coprocessor then positioning itself on swap stand-by until the processor is capable of receiving the parameters of the new task to be executed.

The coprocessor is composed of at least three automata, i.e.

a first automaton specialized in the management of exchanges between the coprocessor with the processor, with the local memory MiL, with the swap memory MiE, the common bus BC, the local exchange bus BiE and the hardware event bus (BEV);

a second automaton specialized in management of the functions during time slice expirations;

a third automaton for the management of certain real-time objects linked with the function being performed during the time slice in process, especially management of queues of eligible tasks awaiting the processor, management of local time such as the timeouts, management of queues awaiting the mailboxes and semaphores, tasks awaiting global or local events and the handling of external interruptions.

These automata communicate with one another by means of a bus inside the component, the primitives relating to the global events being broadcast on the hardware event bus.

Each coprocessor component has mechanisms ensuring segregation of the real-time objects specific to the different functions managed in the processor with which this component is associated.

Each coprocessor has mechanisms ensuring the switching from one function to another function corresponding to the end of a time slice allocated to the function aborted and to a new time slice allocated to the newly processed function.

The aborting of a function results in the freezing of the entire real-time context of the function aborted, and therefore in moving all the tasks of the function into the frozen state, in the blocking of all data relating to local time of the function, though without blocking the data relating to global time or global events.

Any event relating to global time only becomes effective when the function is resumed when a new time slice is granted to the function in question, as is also the case with global events broadcast in the bus (BEV).

The coprocessor also has copy automata for transferring data, independently of the execution of the processor, between a source memory and a destination memory, the source memory can be the swap memory or the local memory of the processor and the destination memory can be the local memory or the swap memory. The transferral of data blocks can be carried out by blocking the buses used for the transfer in order to ensure that the data comprising the block are coherent.

Figure 3:
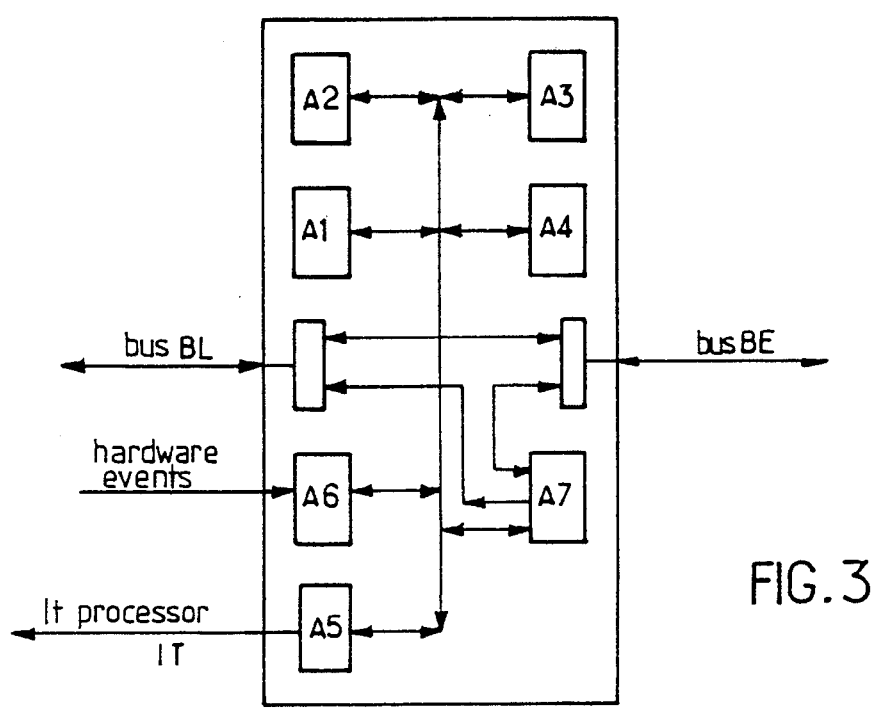
FIG. 3 is a schematic representation of the architecture of a coprocessor component embodying the invention.

As can be seen in FIG. 3, the coprocessor can comprise seven automata of which one is more particularly intended for time management, and therefore notably of the time slices, and of which a second is intended for the management of exchanges with the processor:

the processor communications automaton A1 can handle the management of exchanges with the processor, especially the distribution of processings over the other automata as a function of primitives requested by the processor;

the time management automaton A2 can manage absolute time, the time slices and the local time-related objects linked with the functions; it is this automaton that segregates the local objects of each function within the component;

the semaphore automaton A3 manages the counter semaphores and the associated queues of tasks on stand-by;

the mailbox automaton A4 manages the mailboxes and the associated queues of tasks on stand-by;

the scheduler automaton A5 manages the queues of eligible tasks on stand-by and can thus transmit the interruptions to the processor;

the event automaton A6 manages the events including the tasks awaiting an event; it can handle the external interruptions;

the copy automaton A7 manages the copying of memory blocks.

Each of these automata comprises a sequencer or state device and an interface with the internal bus of the component.

The coprocessor comprises an interface between the internal bus and the local bus BL of the processor module.

It further comprises an interface between the internal bus and the exchange bus BE.

It also further comprises means for transmitting an interruption signal to the processor in question, notably when the scheduler decides a task change in this processor or if it detects an anomaly with its security mechanisms. This signal remains active as long as the processor has not gained access to the coprocessor for reading the code of the operation to be executed or for identifying the cause of the anomaly. For certain primitives which systematically call into question the task in process, it is by reading the execution report passed by the coprocessor to the processor that the latter will know the new elected task.

The coprocessor has external interruption inputs ITs exts as well as means for shaping and memorizing these interruption signals. With regard to the list of real-time objects managed, these interruptions are processed like hardware events.

Figure 4:
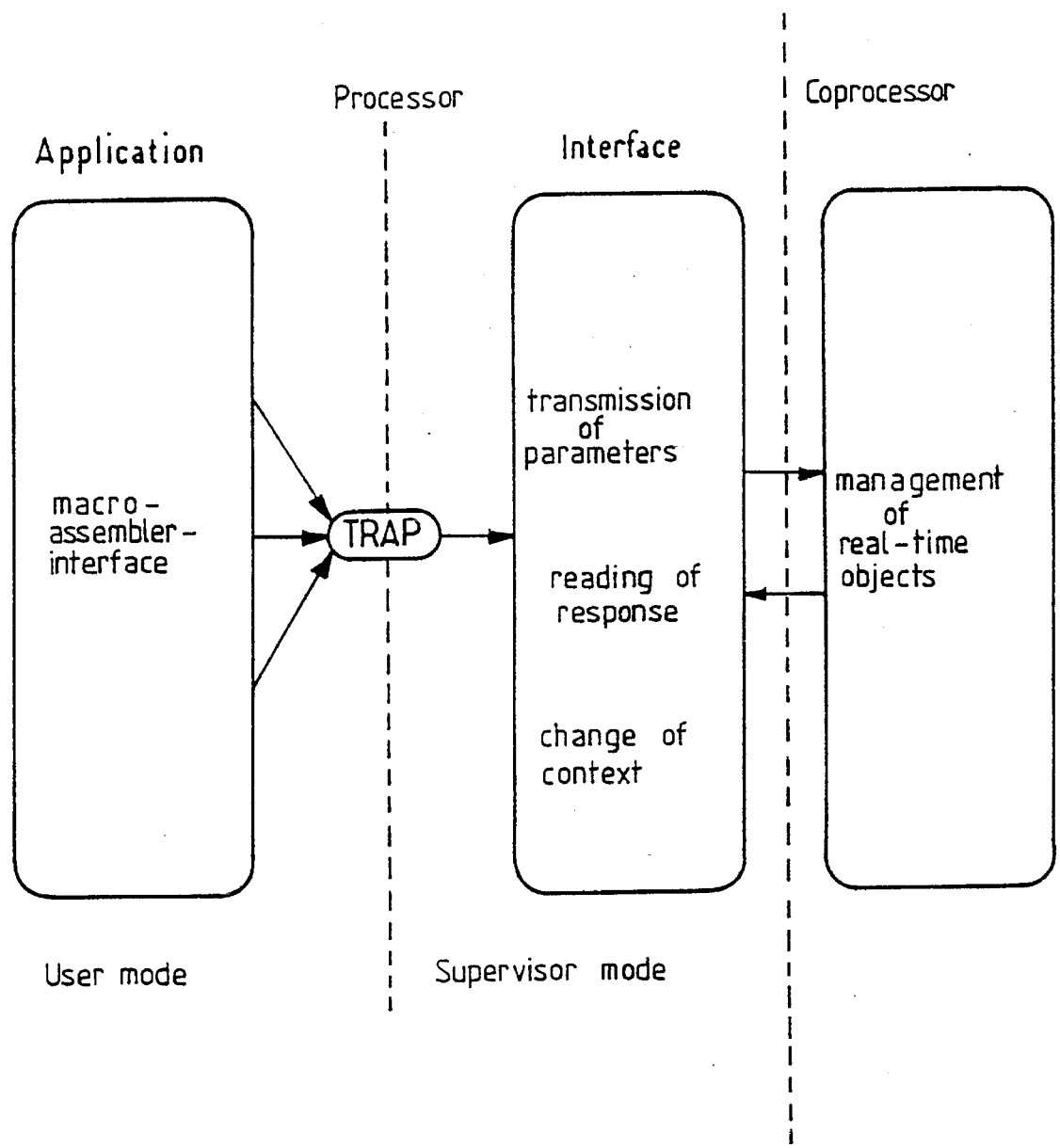
FIG. 4 is a schematic representation of the application/Application Supervisor/coprocessor interface.

Within an application, the interface between the processor (user mode) and the coprocessor is comprised of a supervisor (supervisor mode) according to a process illustrated in FIG. 4.

For a microprocessor, entry into the supervisor is gained via a TRAP instruction. This instruction, which enables an application to make system calls, forces an exception and switches from the user mode to the supervisor mode in which the entire code belonging to the supervisor (Application or Common Supervisor) is carried out.

A primitive is comprised of a group of instructions carrying out the following processings:

saving of the registers required for the passing of parameters;

loading of the parameters in the freed registers or in the RAM;

entry to the TRAP monitor;

(execution of the request);

after return, restoral of the used registers.

As the supervisor is the interface between the processor and the coprocessor, the executed code operates as follows:

primitive request (test to see if the coprocessor is available);

transmission of the parameter(s).

The continuation varies according to the type of request:

a) Request without reply from the coprocessor:
return to the user program.

b) Request with reply from the coprocessor:
reading of the code indicating the operation to be performed;
change of task, when applicable;
return to the user program.

It should be noted that the processor can only be interrupted during the context change phase.

As previously defined, the coprocessor can perform two types of processings, the first type being triggered at the initiative of the processor (primitive request), and the second type being triggered by a hardware event or by an internal event of the coprocessor such as expiration of a timeout, an end of slice, etc.

First Type: Primitive Request

The processor wishing to access the coprocessor to execute a primitive must check beforehand that the coprocessor is available since the coprocessor only processes one primitive at a time. The "busy" or "free" reply from the coprocessor is transmitted by hardware operation to avoid possibly disturbing execution of a processing in process on the component triggered internally by a hardware or time event.

If the coprocessor declares itself free, it immediately positions itself in the busy state in order to reserve itself for the primitive requested by the processor (this results in automatic postponing of all processing associated with the occurrence of an external or internal event).

The processor sends the code and parameters of the primitive by a simple write operation to the coprocessor addressing zone. The processing is then carried out in the coprocessor.

If the primitive needs a reply, the processor acquires the data that will enable it to take the corresponding action by successive read operations in the coprocessor.

If the primitive does not need a reply, the processor continues to execute the task in process.

Second Type: Internally Triggered Processing

Upon expiration of a timeout, of a hardware event or of the end of a time slice, internal processings of the coprocessor are triggered.

If these events (in the general sense) call into question the task in process in the processor, or if they signal that something abnormal has occurred, an interruption is sent to the processor to force it to react. The latter then consults the coprocessor in order to read the data required to process the event in question.

Among the advantages of the previously described device, special emphasis should be put on the following:

the processor is unburdened of real-time management by offering fast execution times for intra-function real-time services on sliced time function management architectures;

the processor is unburdened of data block transfers between the local memory and the swap memory associated with the exchanges on the backpanel bus of the rack;

independence of the processor or microprocessor type;

hardware that can be taken on board (low space requirements, low power consumption);

ease of installation of various nuclei from the basic primitives installed;

ease of interfacing with high-level language compilers;

upgraded security due to the segregation of the real-time objects specific to each function and fine time controls for all tasks;

independence with regard to third party companies such as the suppliers of compilers or real-time supervisors.

We claim:

1. A device for managing a real-time context of a system which comprises at least one processor working with a processor cycle so as to execute in apparent simultaneity several functions, each comprising an assembly of tasks providing high level services, and a coprocessor in the form of a component connected to said processor and availing of data relating to said real-time context, said coprocessor comprising means for managing the following steps:

i) time slicing, from a pre-established frame, of said processing cycle into time slices of possible different durations;

ii) allocating to each of said functions a corresponding set of time slices, according to a predetermined layout, the assembly of tasks of said function being activatable exclusively during the time slices of the allocated set, and being put in a frozen state outside the time slices of said allocated set;

iii) saving, at the end of each of said time slices a machine context of the function to be processed before effecting a slice change;

iv) when a new time slice allocated to one determined function is starting, loading the machine context previously saved at the end of a previous time slice allocated to this determined function, electing a top priority task to be executed belonging to said determined function, and activating said determined function so as to execute at first said priority task with the loaded machine context, wherein said coprocessor comprises at least three automata:

first automaton for managing exchanges between said coprocessor and said processor, via a local memory, a swap memory, a common bus, a local exchange bus BiE and a hardware event bus;

a second automaton for managing said functions during said time slices;

a third automaton for managing certain real-time objects linked with an active function being performed during the time slice in process, especially for managing queues of eligible tasks awaiting said processor, for managing local time such as timeouts, for managing queues awaiting mailboxes and semaphores, for managing tasks awaiting global or local events and for handling external interruptions;

these three automata communicating with one another by means of a bus inside the coprocessor component, primitives relating to global events being broadcast on said hardware event bus.

2. The device as claimed in claim 1, which comprises mechanisms ensuring segregation of real-time objects specific to the functions managed in said processor with which said coprocessor component is associated.

3. The device as claimed in claim 1, which comprises mechanisms ensuring switching from an aborted function to a newly processed function corresponding to an end of the time slice allocated to said aborted function and to a new time slice allocated to said newly processed function.

4. The device as claimed in claim 1 which also comprises copy automata for transferring data independently of said processor, between a source memory and a destination memory.

5. The device as claimed in claim 1, which comprises the following seven automata:

a processor communications automaton used to manage exchanges with said processor, including a distribution of processings over the other automata as a function of primitives requested by said processor;

a time management automaton for managing said absolute time, said time slices and local time-related objects linked with said functions, said time management automaton segregating local objects of each function within the coprocessor component;

a semaphore automaton for managing binary semaphores and the counter semaphores and associated queues of tasks on stand-by;

a mailbox automaton for managing mailboxes and associated queues of tasks on stand-by;

a scheduler automaton for managing queues of eligible tasks on stand-by and therefore capable of transmitting an interruption to said processor;

an event automaton for managing events including tasks awaiting an event, and handling the external interruptions;

a copy automaton for managing copying of memory blocks.

6. A method for managing a real-time context of a system which comprises at least one processor with a processor cycle so as to execute independently and in apparent simultaneity several functions, each of said functions comprising an assembly of tasks providing high level services, and a coprocessor in the form of a component connected to said processor and availing of data relating to said real-time context, said method comprising management by said coprocessor of the following steps:

i) time slicing, from a pre-established frame of said processing cycle into time slices of possibly different durations, ii) allocating to each of said functions a corresponding set of time slices, according to a predetermined layout, the assembly of tasks of said function being activatable and processed exclusively during the time slices of the allocated set, and being put in a frozen state outside the time slices of said allocated set;

iii) saving, at the end of each of said time slices, a machine context of the processed function before effecting a slice change;

iv) when a new time slice allocated to one determined function is starting, loading the machine context previously saved at the end of a previous time slice allocated to this determined function, and processing said determined function within said new time slice by scheduling and executing the tasks of said determined function in relation to respective priorities of said tasks and of said real-time context.

7. The method as claimed in claim 6, wherein said processor comprises two levels of execution:

a first level called "Application Supervisor" on which a function will rely to schedule tasks in relation to the real-time context and to resources and events required by the function to perform within said processor;

a second level called "Sequency Supervisor" which provides services needed for time-sharing of said processor between the different functions installed in said processor and management of global events.

8. The method as claimed in claim 6, wherein said coprocessor component comprises a scheduler for managing functions by time slices by means of a Sequencing Supervisor, and for performing services in the form of primitives by said processor to enable real-time linking of the functions, within corresponding time slices.

9. The method as claimed in claim 8, wherein said coprocessor functions in two operating modes:

a slave type operating mode, in which said coprocessor is perceived by the processor as memory; this mode being used to execute primitives and being translated by reading and writing at a coprocessor address;

a master type operating mode, in which it can read or write data in a local memory.

10. The method as claimed in claim 6, wherein at the end of a time slice, said coprocessor generates an interruption destined for indicating to the processor that it must abort the function in process to take up the function indicated by said coprocessor, and wherein until receipt of said interruption, said processor performs the following successive stages:

execution of a sequence enabling it to save a minimum machine context of said function in process for proper resumption at a next associated time slice;

transmission of a message to said coprocessor for advising it that it is ready to receive a number of a newly active function as well as a top priority task to be executed belonging to said function;

reloading of the machine context linked with an activation of said function and with an election of said task of which the context may have been saved at the end of a last time slice relating to a newly reactivated task.

11. The method as claimed in claim 10, which uses several modules, each comprising a processor connected to a coprocessor, said method further comprising a periodical synchronization phase for maintaining a system time common to all the coprocessors for enabling synchronization of slice changes in the different modules.

12. The method as claimed in claim 6, which uses a time reference generated by a backpanel bus interface component and wherein said slice change is commanded by said component which alerts said processor by means of an interruption, said processor then executing a primitive which orders said coprocessor to change applications, and said coprocessor subsequently checking that said slice change is indeed within a time window.

* * * * *